United States Patent [19]
Mendes

[11] Patent Number: 5,720,219
[45] Date of Patent: Feb. 24, 1998

[54] FRUIT JUICE EXTRACTION MACHINE

[76] Inventor: Carlos Neto Mendes, Rua Voluntarios de Patria 1738, Araraquara, Brazil

[21] Appl. No.: 759,722

[22] Filed: Dec. 6, 1996

[30] Foreign Application Priority Data

Dec. 8, 1995 [BR] Brazil .................................. 7502785 U

[51] Int. Cl.$^6$ .................................................. A23N 1/02
[52] U.S. Cl. .......................... 99/509; 99/495; 99/513; 100/98 R; 100/108; 100/213
[58] Field of Search .......................... 99/495, 509–513; 100/98 R, 108, 213, 215, 218, 245, 125

[56] References Cited

U.S. PATENT DOCUMENTS

| | | | |
|---|---|---|---|
| 4,922,813 | 5/1990 | Compri | 99/510 |
| 5,070,778 | 12/1991 | Cross et al. | 100/98 R |
| 5,339,729 | 8/1994 | Anderson | 99/509 |

*Primary Examiner*—Timothy F. Simone
*Attorney, Agent, or Firm*—George A. Bode; Bode & Associates

[57] ABSTRACT

A fruit juice extraction apparatus for processing citrus fruit in general, without manual contact, comprising a tubular chassis having mounted thereon an extraction box affixed to a gearmotor for actuating a sliding assembly which dislocates one concave hemisphere against another concave hemisphere, thereby pressing fruit released by a trigger positioned on an opening in a tray in which one of the concave hemispheres has a fruit peeler and on the other a perforating tube for the extraction of the juice, the solid residues of the fruit being released into a receptacle and the liquid passing through a filter, then falling into a reservoir which has outlet ports therein.

6 Claims, 5 Drawing Sheets

FRUIT JUICE EXTRACTION MACHINE

BACKGROUND OF THE INVENTION

1. Field of the Invention

The present patent referred to here as,"IMPROVEMENT IN A FRUIT JUICE EXTRACTION MACHINE", as the title implies, improvements to the object described in process PI-9503109-0, of Aug. 7, 1995, of the same claimant, which refers to PI 9502244-9 of Jun. 19, 1995, (and which is repeated herein below) which refers to a machine developed to extract juice from citrus fruit such lemon, orange, tangerine, pokan, etc., providing greater practicality and hygiene, with the advantage of eliminating manual contact during the extraction of the fruit juice. For such, the present improvement consists of a system of guide tubes which orient the synchronized and concentric elements between themselves (peeler cups) which press the orange (which we will use in this report as an example).

It is worth noting that the improvement described herein, more specifically, consists in mounting a single assembly, concentrically, said guide tubes, as well as the rods responsible for the return of the piston which executes the cleaning of the perforating filtering tube which penetrates the fruit.

As in any equipment today available, the citrus juice extraction machine originally claimed, has been subject to constant improvements as a consequence of practical tests which have been carried out day-to-day.

As can be noted from the previous patent, basically the equipment works through the two concentric peeling cups, which press the fruit shearing the skin and extracting the juice through the perforating tube; inside this tube, a piston slides with the purpose of cleaning the filtering system. Said piston is driven by the pressure of the fruit, being that the return (cleaning function), is pulled by the two rods parallel to the guide tubes and slaved to the returning motion of the mobile peeler cups.

It occurs that by the fact of remaining exposed, the rods become dirty with residue of the fruit processed, which compromise the sanitation of the equipment and the functioning of the movable parts.

It is worth noting that the referred to citrus juice extraction machine can process oranges, lemons, tangerines, etc.

The invention referred to herein as "CONFIGURATION OF A FRUIT JUICE EXTRACTION MACHINE" or fruit juice extraction apparatus is, as is alluded to in the name itself, a machine developed for the production of citrus fruit juices, such as: lemon, orange, tangerine, ponkan, etc., providing greater practical and sanitary conditions, with the advantage of totally eliminating manual contact during the extraction of the juice from the fruit.

2. Description of the Prior Art

The "CONFIGURATION OF A FRUIT JUICE EXTRACTION MACHINE" of the present invention consists of an automatic system where synchronized and concentric elements press the orange (this fruit will be used only as an example), without crushing the peel, by this avoiding the dispersion of acids (from the peel), favoring the retention of totally natural juice.

Particularly in the case of commercial establishments, we know that in these localities orange juice is extracted by use of electrical rotary squeezers that are noisy and non-sanitary; and such squeezers are of low production and generate excessive physical fatigue on the part of the operator, since he has to cut hundreds of oranges in half every day, processing each and every orange half in the squeezer. It is not difficult to notice that this process is non-sanitary, since manual contact is indispensable.

These factors make the instantaneous production of natural juice not viable, since the slow rates of production make for an expensive final product, plus the fact that consumers will tend to opt for processed drinks given the lack of sanitary conditions in the extraction of natural juices. It is also important to observe the existence of manual squeezers, that incorporate all of the previously mentioned negative features, and are totally not viable for production of juice on a commercial scale.

Equipment that crush all of the fruit in the extraction of juice have an elementary disadvantage that is the dispersion of the acids in the peel, leaving the juice with a bitter taste, not fit for consumption.

It is worth noting that to resolve these problems, several types of machinery and equipment for the extraction of juice have appeared, incorporating important shortcomings that are important to be analyzed, such as:

currently it is known of a machine for processing citrus fruit, especially oranges, where there is a system which after the insertion of the fruit, it is cut in half, and the halves are separated in two rotating cylinders in which two geared reamers, also rotating and hemispherical in shape, crush the fruit halves extracting the juice.

Nevertheless, this system, because of its characteristics, exposes the extracted juice to the peel, in such a manner that the juice bathes, partially or totally, the peel, provoking an emulsification of the oil contained in the peel, incorporating it in the juice, making it acidic and bitter.

It is worth noting that in laboratory tests, it is observed that the level of peel oil in the juice, with this system, varies from 50 to 500% above the norm tolerable for consumption.

There are also other known equipment that function in distinctly different manners than the one previously cited, encompassing voluminous and heavy mechanical systems that provoke the crushing of the whole fruit.

To have a more complete idea of these machines, they are so heavy that they require the use of hoists or cranes for maneuvering.

The existing mechanical systems consist Of actuated arms that compress the fruit between two concentric peelers. Said concentric peelers are built with multiple radial openings that interlink with each other (one cupping the other). Nevertheless, the design of the openings makes it such that the fruit becomes crushed and not cut, resulting in the liberation of peel oil into the juice.

As a result of the large space occupied by the machines, the space for fruit storage becomes very limited, forcing the operator to feed the machine constantly.

Systems taught in FMC Corporation's U.S. Pat. No. 5,070,778, U.S. Pat. No. 5,170,700, U.S. Pat. No. 5,339,729 and, U.S. Pat. No. 5,483,870, produce oil in the juice and the vertical cores have a tendency to jam with the fruit.

In analyzing these inconveniences, the applicant, who is active in this segment of the market, has developed the apparatus herein claimed, as a definitive solution to these inconveniences.

The "CONFIGURATION OF A FRUIT JUICE EXTRACTION MACHINE" of the present invention is notably more compact and as a consequence lighter. This is due to the utilization of simplified mechanisms with greater functional efficacy.

These mechanisms make possible the easy cleaning of the equipment and less maintenance, noting also that the noise level is slightly lower.

In its fundamental scope, the "CONFIGURATION OF A FRUIT JUICE EXTRACTION MACHINE" fact presented herein functions in the following manner:

on the upper part of a tray which holds several fruit which, by force of gravity, fall one by one between two concave and radially cut hemispheres, one of those moves axially being actuated by a rod connected to a type of crankshaft arm.

The system does not crush the peel and does shear it in multiple slivers, at the same time it compresses the fruit, a factor that impedes the release of the oil in the peel. It is worth noting that this peel, after the extraction of the juice, falls totally dry into an appropriate reservoir.

Unequivocally, it can be concluded that the cost/benefit relationship of the present invention is greater than that of those known to date, because of its compact nature and high quality juice produced, similar to a home made juice.

Because of these advantages and others that will easily be noticed by the user, as well as its uniqueness in relation to the state of the technology, the applicant, therefore, submits this "CONFIGURATION OF A FRUIT JUICE EXTRACTION MACHINE" and its "IMPROVEMENT IN A FRUIT JUICE EXTRACTION MACHINE" have the requisites for achieving patent approval.

SUMMARY OF THE INVENTION

The apparatus of the present invention or machine for processing citrus fruit by extracting the juice in general, without manual contact, comprises a tubular chassis fixed to an extraction box being on it affixed a gearmotor actuating an crank and rod assembly which dislocates one concave hemisphere against another concave hemisphere pressing the fruit released by a trigger situated on an opening in a tray in which one of the concave hemispheres has a central pin and on the other a perforating tube for the extraction of the juice, the solid residues being released into a receptacle and the liquid being passed through a filter and then falling into a reservoir which has faucets or outlets.

In this manner, analyzing the problem, the claimant developed a system where the rods work telescopically on the inside of the mobile peeler guide tubes, making the equipment simpler and more compact, and especially improving the sanitary conditions.

Said system makes it possible for an easy cleaning of the equipment and less maintenance, in addition, we call attention to a lesser noise level.

Because of these advantages and others which are readily noticeable by the user, as well as because of its singularity in relation to the state of the technology, the present improvement embodies the necessary requirements to achieve the claim herein pursued.

BRIEF DESCRIPTION OF THE DRAWING

With the object of better elucidating the apparatus herein and for a further or better comprehension of the model for understanding the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
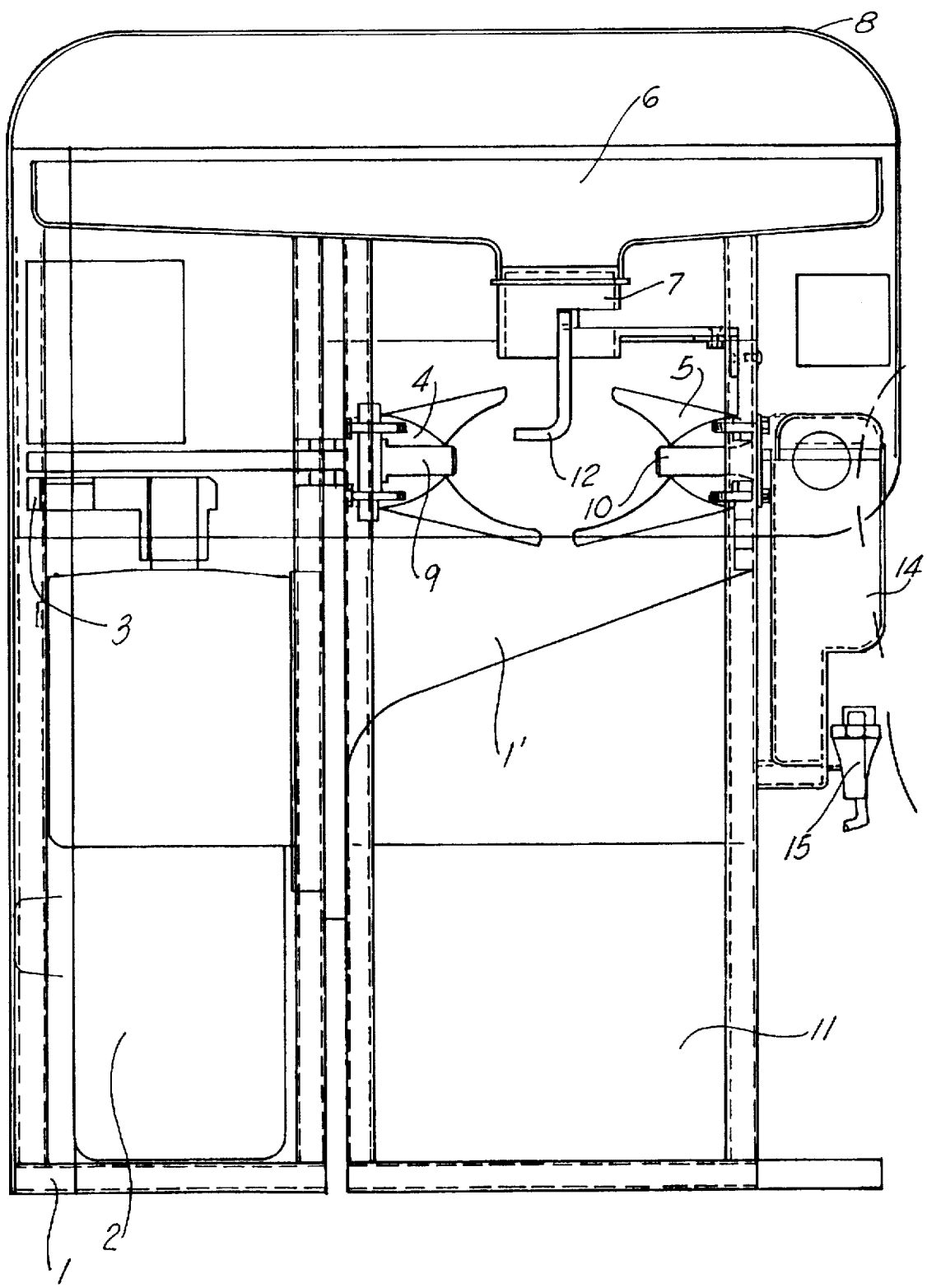
FIG. 1 is a side elevational view, partially in cross-section, of the preferred embodiment of the apparatus of the present invention.
Figure 2:
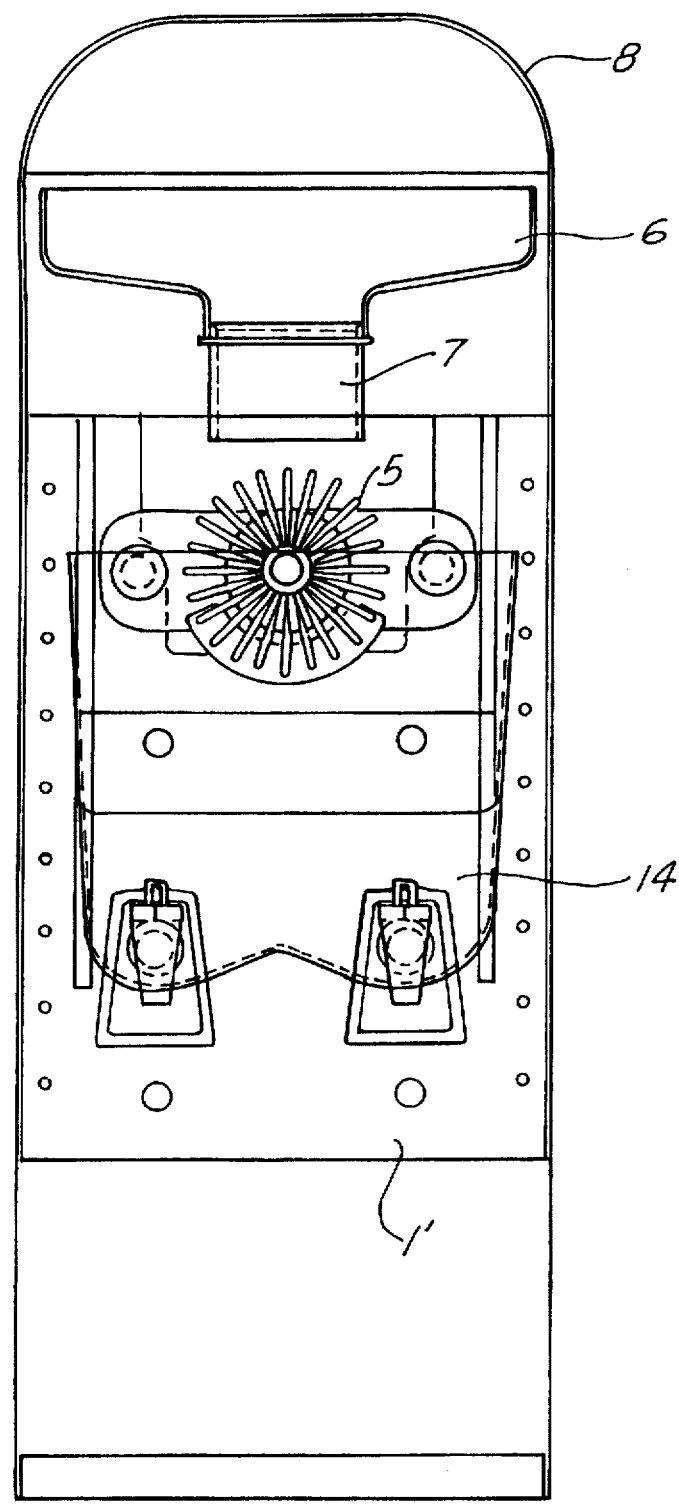
FIG. 2 is front elevational view, partially in cross-section, of the embodiment of FIG. 1.
Figure 3:
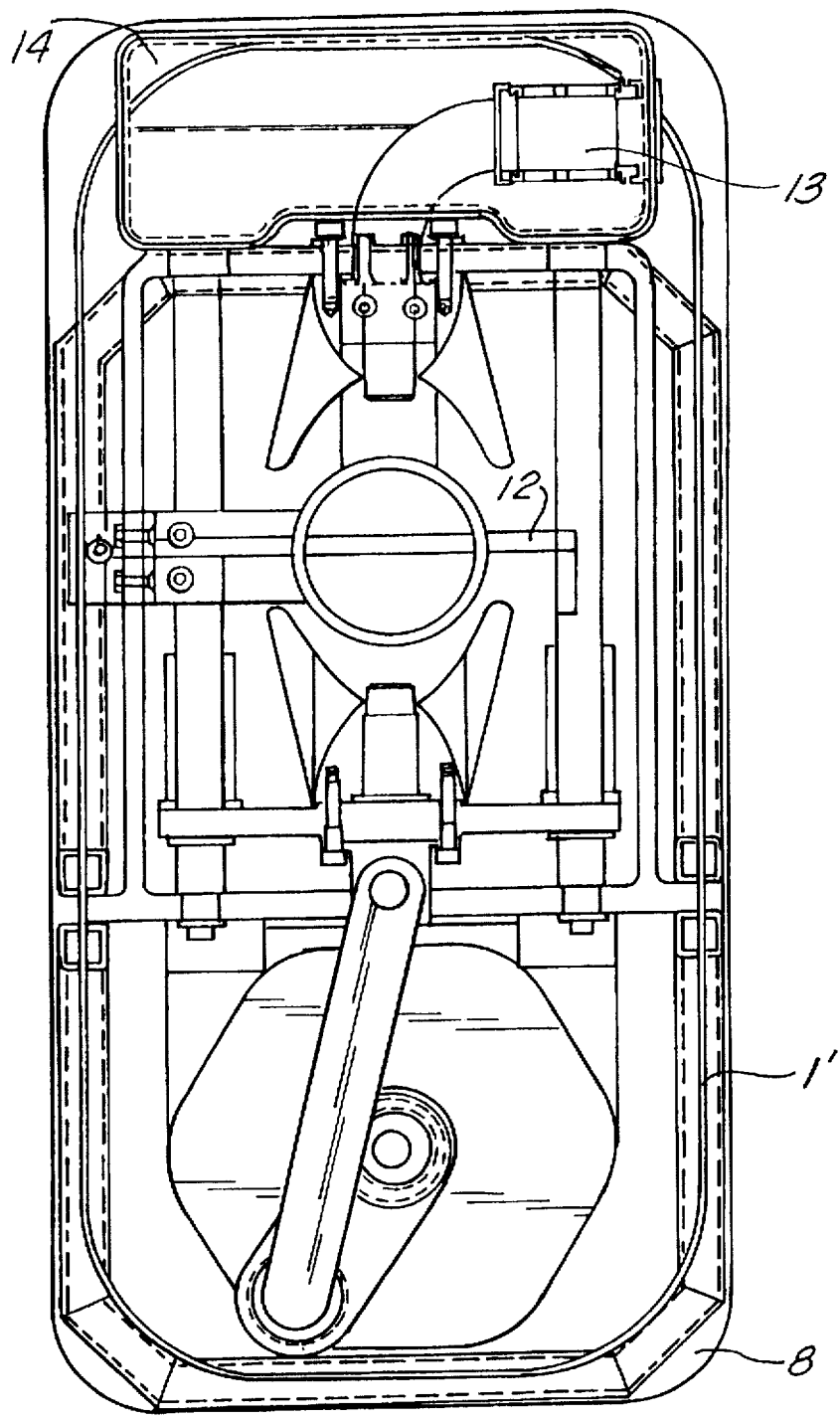
FIG. 3 is a top plan view, partially in cross-section, of the embodiment of FIG. 1.

CONFIGURATION OF A FRUIT JUICE EXTRACTION MACHINE or the fruit juice extracting apparatus of the present invention, in accordance with FIGS. 1-3, comprises a tubular chassis 1, affixed to an extraction box 1' for housing juice, mounted vertically on this box 1' is a gearmotor 2 which drives a crank and rod 3 which provokes the axial movement of one of the concave and radially cut hemisphere 4 against the other concave and radially cut hemisphere 5, both radially interfacing.

On the upper part of the apparatus is provided a tray 6 with an opening 7 through which the fruit is driven to fall in between the concave hemispheres 4, 5, all shielded by a protective cover 8 over the entire assembly.

The concave hemisphere 4 has a concentric central pin 9 and the concave hemisphere 5 has a perforating tube 10 through which the juice is extracted. The fruit peel and core fall into receptacle 11.

The concave hemisphere 4 drives a trigger 12 during its motion feeding one fruit at a time; the juice coming from the tube 10 passes through a filter 13 and is retained in a reservoir 14 which is equipped with faucets or outlet ports 15 for dispensing.

Incidental residues, such as core and seeds do not pass through the filter 13 and are ejected through the tube 10 toward the receptacle 11.

Figure 4:
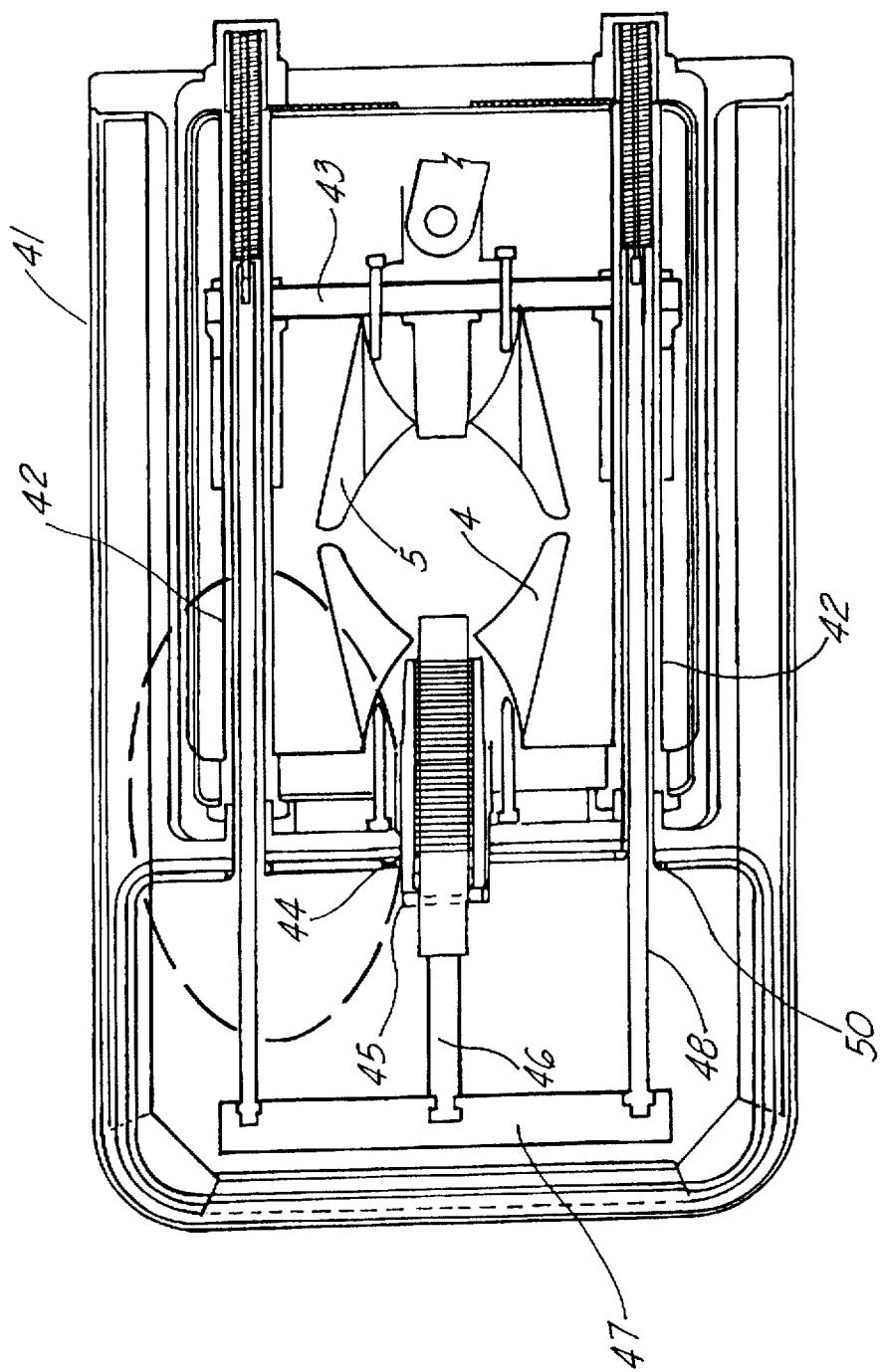
FIG. 4 shows a top view of the machine.
Figure 5:
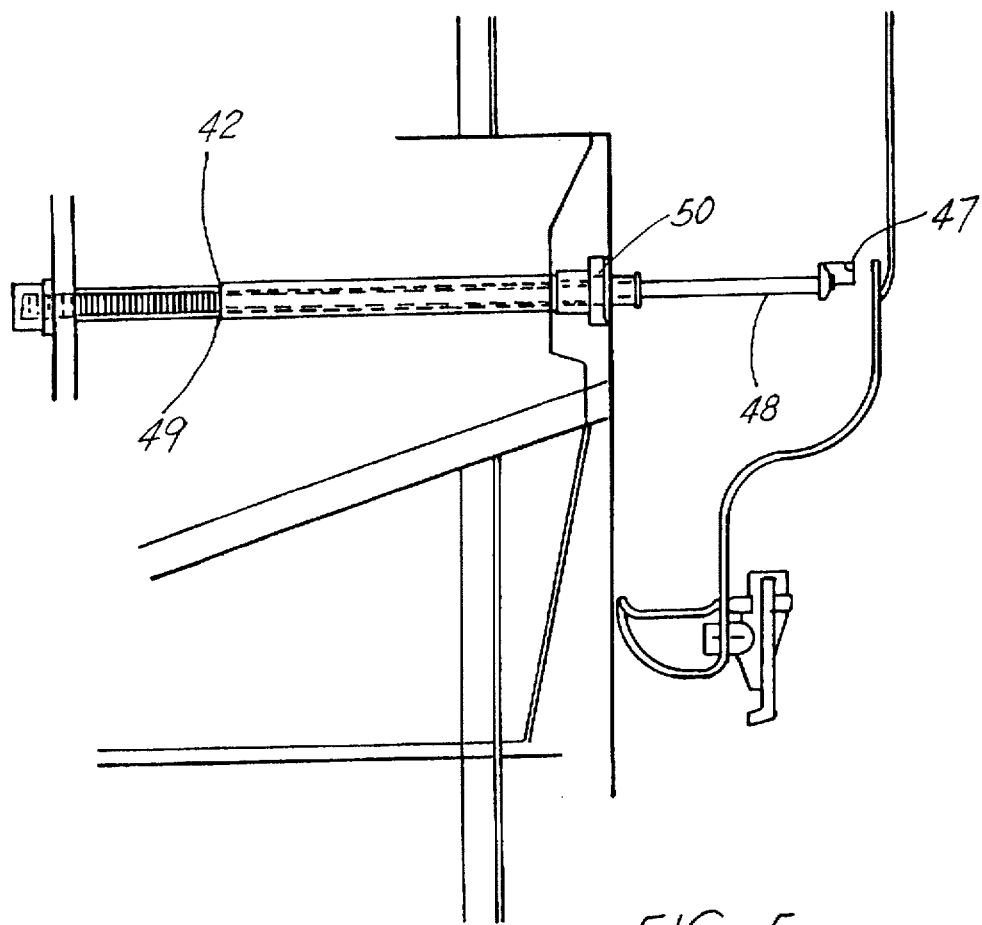
FIG. 5 shows a simplified side view of the machine.
Figure 6:
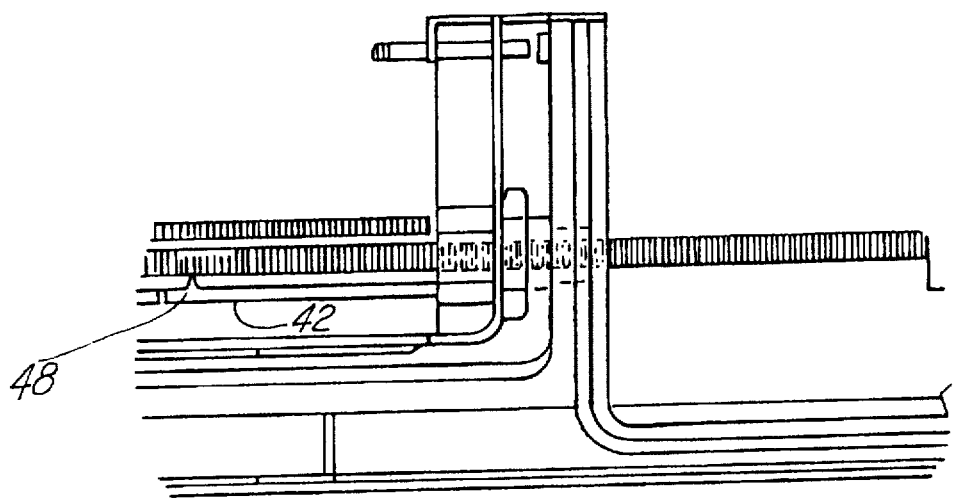
FIG. 6 shows an enlarged detail of FIG. 4.

"IMPROVEMENT IN A FRUIT JUICE EXTRACTION MACHINE", best seen in FIGS. 4-6, an alternate embodiment of that shown in FIGS. 1-3, in accordance with the FIGS. 4-6 included, comprised of a body 41 encompassing the structure of the machine.

As in the previous process, PI-9502244-9 of Jun. 19, 1995, the system is comprised of body 41 composed of two guide tubes 42, parallel and of cylindrical tubular section, on which slides a support 43 of the mobile peeler cup.

Noticeable is the perforating filter 44, fixed by a nut 45, being that inside it works the cleaning piston 46 whose rods are mounted on a support 47, being on this support fastened the rods 48, which in turn are held fixed by orthogonal pin 49 on support 43.

Said rods 48 work concentrically in the interior of the guide tubes 42, therefore not exposed to residues in the processing of the fruit. Being that the guide tubes are sealed, assuring the closing and lubrication of the rods 48. Nuts 50 incorporating seals, guarantee the necessary protection and lubrication of the rods 48 in conjunction with the guide tubes 42.

What is claimed as invention is:

1. A fruit juice extraction apparatus comprising:
    a chassis having mounted thereon juice extraction means;
    said juice extraction means having means for storing said fruit, said storing means having an aperture therein for allowing articles of said fruit to be deposited between two concave hemispheres;
    drive means for actuating means for forcing the first of said concave hemispheres against the second of said concave hemispheres, thereby pressing an article of said fruit deposited between said hemispheres, said means for forcing comprising, a pair of spaced-apart guide tubes having slidably mounted thereon a support member on which said first concave hemisphere is mounted;

said first concave hemisphere having fruit peeling means and said second concave hemisphere a perforating tube for the extraction of juice from said article of fruit, whereby the solid residue is deposited in a receptacle and the liquid is passed through a filter and then falls into a reservoir which has outlet ports therein.

2. The apparatus of claim 1, wherein said support member slidably moves said first concave hemisphere against and away from said second concave hemisphere.

3. A fruit juice extraction apparatus comprising:

a tubular chassis having mounted thereon juice extraction means;

said juice extraction means having a container for storing said fruit, said container having an aperture therein for allowing articles of said fruit to be deposited between two concave hemispheres;

a motor for actuating means for forcing the first of said concave hemispheres against the second of said concave hemispheres, thereby pressing an article of said fruit deposited between said hemispheres, said means for forcing comprising, a pair of spaced-apart guide tubes having slidably mounted thereon a support member on which said first concave hemisphere is mounted;

said first concave hemisphere having fruit peeling means and said second concave hemisphere a perforating tube for the extraction of juice from said article of fruit, whereby the solid residue is deposited in a receptacle and the liquid is passed through a filter and then falls into a reservoir which has outlet ports therein.

4. The apparatus of claims 3, wherein said support member slidably moves said first concave hemisphere against and away from said second concave hemisphere.

5. A fruit juice extraction apparatus comprising:

a tubular chassis having mounted thereon juice extraction means;

said juice extraction means having a container for storing said fruit, said container having an aperture therein and means for releasing an article of said fruit for allowing said article of said fruit to be deposited between two concave hemispheres;

a motor for actuating means for forcing the first of said concave hemispheres against the second of said concave hemispheres, thereby pressing an article of said fruit deposited between said hemispheres, said means for forcing comprising, a pair of spaced-apart guide tubes having slidably mounted thereon a support member on which said first concave hemisphere is mounted;

said first concave hemisphere having fruit peeling means and said second concave hemisphere a perforating tube for the extraction of juice from said article of fruit, whereby the solid residue is deposited in a receptacle and the liquid is passed through a filter and then falls into a reservoir which has outlet ports therein.

6. The apparatus of claim 5, wherein said support member slidably moves said first concave hemisphere against and away from said second concave hemisphere.

\* \* \* \* \*